United States Patent
Barraud et al.

(10) Patent No.: US 11,351,499 B2
(45) Date of Patent: Jun. 7, 2022

(54) TREATMENT OF A METHANE STREAM COMPRISING VOCS AND CARBON DIOXIDE BY A COMBINATION OF AN ADSORPTION UNIT AND A MEMBRANE SEPARATION UNIT

(71) Applicant: L'Air Liquide, Societe Anonyme pour l'Etude et l'Exploitation des Procedes Georges Claude, Paris (FR)

(72) Inventors: Francois Barraud, Sassenage (FR); Thomas Rohmer, Sassenage (FR); Michael Guillin, Paris (FR)

(73) Assignee: L'Air Liquide, Societe Anonyme Pour L'Etude Et L'Exploitation Des Procedes Georges Claude, Paris (FR)

(*) Notice: Subject to any disclaimer, the term of this patent is extended or adjusted under 35 U.S.C. 154(b) by 50 days.

(21) Appl. No.: 16/905,567

(22) Filed: Jun. 18, 2020

(65) Prior Publication Data
US 2020/0398217 A1    Dec. 24, 2020

(30) Foreign Application Priority Data
Jun. 20, 2019 (FR) ...................................... 1906644

(51) Int. Cl.
*B01D 53/22* (2006.01)
*B01D 53/047* (2006.01)
*B01D 53/30* (2006.01)

(52) U.S. Cl.
CPC ......... *B01D 53/229* (2013.01); *B01D 53/047* (2013.01); *B01D 53/226* (2013.01);
(Continued)

(58) Field of Classification Search
None
See application file for complete search history.

(56) References Cited

U.S. PATENT DOCUMENTS

2004/0103782 A1* 6/2004 Wascheck ............ B01D 53/229
95/50
2013/0098242 A1* 4/2013 Ungerank ............ B01D 53/226
95/51
(Continued)

FOREIGN PATENT DOCUMENTS

EP    3 369 473    9/2018
EP    3 437 713    2/2019
(Continued)

OTHER PUBLICATIONS

French Search Report and Written Opinion for FR 1 906 644, dated Mar. 16, 2020.

*Primary Examiner* — Jason M Greene
(74) *Attorney, Agent, or Firm* — Christopher J. Cronin

(57) ABSTRACT

At least some VOCs are removed from a feed gas in an adsorption unit comprising at least three adsorbers following a pressure cycle with a phase shift, wherein the feed gas comprises at least methane, carbon dioxide and volatile organic compounds (VOCs). The VOC depleted gas is fed to at least one membrane separation to produce a carbon dioxide-enriched permeate and a methane-enriched retentate. The flow of the feed gas stream is adjusted based upon one or both of a pressure or methane concentration of the gas stream entering the membrane separation unit and/or a pressure in the adsorption unit.

14 Claims, 2 Drawing Sheets

(52) U.S. Cl.
CPC ........ *B01D 53/30* (2013.01); *B01D 2256/245* (2013.01); *B01D 2257/504* (2013.01); *B01D 2257/708* (2013.01); *B01D 2258/05* (2013.01)

(56) References Cited

U.S. PATENT DOCUMENTS

| | | |
|---|---|---|
| 2018/0250627 A1 | 9/2018 | Zick et al. |
| 2019/0001263 A1 | 1/2019 | Prince et al. |
| 2019/0126187 A1* | 5/2019 | Tanaka ................. B01D 53/229 |

FOREIGN PATENT DOCUMENTS

| | | |
|---|---|---|
| WO | WO 2014 104196 | 7/2014 |
| WO | WO 2017 109305 | 6/2017 |

* cited by examiner

TREATMENT OF A METHANE STREAM COMPRISING VOCS AND CARBON DIOXIDE BY A COMBINATION OF AN ADSORPTION UNIT AND A MEMBRANE SEPARATION UNIT

CROSS-REFERENCE TO RELATED APPLICATIONS

This application claims the benefit of priority under 35 U.S.C. § 119 (a) and (b) to French patent application No. FR 1906644, filed Jun. 20, 2019, the entire contents of which are incorporated herein by reference.

BACKGROUND

Field of the Invention

The present invention relates to a facility and a process for the treatment of a feed gas stream comprising at least methane, carbon dioxide and volatile organic compounds (VOCs), for producing a methane-enriched gas stream.

The invention relates in particular to the purification of biogas, for the purpose of producing biomethane in accordance with the specifications for injection into a natural gas network.

Related Art

Biogas is the gas produced during the decomposition of organic matter in the absence of oxygen (anaerobic fermentation), also known as methanization. This can be natural decomposition—it is thus observed in marshland or in household waste landfills—but the production of biogas can also result from the methanization of waste in a dedicated reactor, known as methanizer or digester.

Due to its main constituents—methane and carbon dioxide—biogas is a powerful greenhouse gas; at the same time, it also constitutes a source of renewable energy which is appreciable in the context of the increasing scarcity of fossil fuels.

Biogas contains predominantly methane ($CH_4$) and carbon dioxide ($CO_2$) in proportions which can vary according to the way in which it is obtained, but also contains, in smaller proportions, water, nitrogen, hydrogen sulfide, oxygen and other organic compounds, in the form of traces.

Depending on the organic matter which has decomposed and on the techniques used, the proportions of the components differ but, on average, biogas comprises, on a dry gas basis, from 30% to 75% of methane, from 15% to 60% of $CO_2$, from 0% to 15% of nitrogen, from 0% to 5% of oxygen and trace compounds.

Biogas is made use of economically in various ways. It can, after a gentle treatment, be exploited close to the production site in order to supply heat, electricity or a mixture of both (cogeneration). The high carbon dioxide content reduces its calorific value, increases the costs of compression and of transportation, and limits the economic advantage of making use of it economically to this use nearby.

More intensive purification of biogas allows it to be more widely used. In particular, intensive purification of biogas makes it possible to obtain a biogas which has been purified to the specifications of natural gas and which can be substituted for the latter. Biogas thus purified is known as "biomethane". Biomethane thus supplements natural gas resources with a renewable part produced within territories. It can be used for exactly the same uses as natural gas of fossil origin. It can feed a natural gas network or a vehicle filling station. It can also be liquefied to be stored in the form of liquefied natural gas (LNG), and the like.

The ways in which biomethane is made use of economically are determined according to the local contexts: local energy requirements, possibilities of making use of it economically as biomethane fuel, existence close to natural gas distribution or transportation networks, in particular. By creating synergies between the various parties operating in a given territory (farmers, manufacturers, public authorities), the production of biomethane assists the territories in acquiring greater energy autonomy.

Several steps need to be completed between collecting the biogas and obtaining the biomethane, the end product capable of being compressed or liquefied.

In particular, several steps are necessary before the treatment which is aimed at separating the carbon dioxide in order to produce a stream of purified methane. A first step consists in compressing the biogas which has been produced and transported at atmospheric pressure. This compression can be obtained, conventionally, using a lubricated screw compressor. The following steps are aimed at freeing the biogas of the corrosive components, which are hydrogen sulfide and volatile organic compounds (VOCs). The technologies used are, conventionally, pressure swing adsorption (PSA) and trapping on activated carbon. Next comes the step which consists in separating the carbon dioxide in order ultimately to have available methane at the purity required for its subsequent use.

Carbon dioxide is a contaminant typically present in natural gas and it is common to need to remove it therefrom. Varying technologies are used for this depending on the situation. Among these, membrane technology performs particularly well when the $CO_2$ content is high is therefore particularly effective for separating the $CO_2$ present in biogas and in particular in landfill gas.

Membrane gas separation processes used for purifying a gas, whether they employ one or more membrane steps, need to make it possible to produce a gas at the required quality, at a low cost, while at the same time minimizing the losses of the gas, that is, to be put to profitable use. Thus, in the case of biogas purification, the separation performed is chiefly a $CH_4/CO_2$ separation which needs to allow the production of a gas containing, depending on its use, more than 85% $CH_4$, preferably more than 95% $CO_2$, more preferentially more than 97.5% $CH_4$, while minimizing the $CH_4$ losses in the residual gas and the cost of purification. Minimizing the cost of purification is associated with the electricity consumption of the device that compresses the gas upstream of the membranes.

It is preferable for the facilities that allow the production of a methane-enriched gas flow to be able to control the methane loss.

On that basis, one problem that arises is that of providing a facility that makes it possible to obtain a stream of methane at a constant concentration.

SUMMARY OF THE INVENTION

One solution of the present invention is a facility for the treatment of a feed gas stream comprising at least methane, carbon dioxide and volatile organic compounds (VOCs), for producing a methane-enriched gas stream, comprising, in the direction of circulation of the feed gas stream:

a) at least one compressor making it possible to increase the pressure of the feed gas stream to a pressure of between 8 and 15 barg,
b) at least one adsorption unit comprising at least three adsorbers which each follow a pressure cycle with a phase shift and which contain an adsorbent that makes it possible to remove at least one portion of the VOCs,
c) at least one membrane separation unit making it possible to receive the gas stream leaving the adsorbers and to produce a carbon dioxide-enriched permeate and a methane-enriched retentate,
d) a pressure sensor adapted and configured to measure the pressure of the gas stream entering the membrane separation unit and/or a methane analyzer adapted and configured to measure the methane concentration in this same stream and/or a pressure sensor(s) adapted and configured to measure the pressure in each of the adsorbers,
e) a controller adapted and configured to compare the measurement with a target value and to adjust the flow of the feed gas stream in order to obtain the target value.

Another solution of the present invention is a facility for the treatment of a feed gas stream comprising at least methane, carbon dioxide and volatile organic compounds (VOCs), for producing a methane-enriched gas stream, comprising, in the direction of circulation of the feed gas stream:
f) at least one compressor making it possible to increase the pressure of the feed gas stream to a pressure of between 8 and 15 barg,
g) at least one adsorption unit comprising at least three adsorbers which each follow a pressure cycle with a phase shift and which contain an adsorbent that makes it possible to remove at least one portion of the VOCs,
h) at least one membrane separation unit making it possible to receive the gas stream leaving the adsorbers and to produce a carbon dioxide-enriched permeate and a methane-enriched retentate,
i) a means for measuring a property of a gas in said facility, and
j) a controller adapted and configured to compare a measurement produced by the means for measuring with a target value and to adjust the flow of the feed gas stream in order to obtain the target value.

A subject of the present invention is also a process for treating a feed gas stream comprising at least methane, carbon dioxide and volatile organic compounds (VOCs) for producing a methane-enriched gas stream, using a facility according to the invention and comprising:
 i. a step of compressing the feed gas stream to a pressure of between 8 and 15 barg,
 ii. a step of removing at least one portion of the VOCs by adsorption of the compressed gas stream in the adsorption unit,
 iii. a step of separating the carbon dioxide and methane in the membrane separation unit,
 iv. a step of measuring the pressure of the gas stream entering the membrane separation unit and/or of measuring the methane concentration in this same stream and/or of measuring the pressure in each of the adsorbers,
 v. a step of comparing the measurement taken in step iv with a target value, and
 vi. in the event of a difference between the measurement taken and the target value, a step of modifying the flow of the feed gas stream in order to obtain the target value.

It should be noted that steps iv to vi make it possible to obtain a methane stream at constant concentration.

Depending on the case, either or both of the facilities and/or the process may have one or more of the following features:
  the facility comprises at least one set of valves at the inlet of the adsorbers and a set of valves 4 at the outlet of the adsorbers and these sets of valves are used to adjust the flow of the feed gas stream at the command of the controller;
  the facility includes a recycle line adapted and configured to recycle at least one portion of the permeate to at least one of the adsorbers, a bypass line optionally being present for bypassing the recycle line;
  the membrane separation unit comprises: a first membrane separation subunit which makes it possible to receive the gas stream leaving the adsorbers and to produce a first carbon dioxide-enriched permeate and a first methane-enriched retentate, a second membrane separation subunit which makes it possible to receive the first retentate and to produce a second carbon dioxide-enriched permeate and a second methane-enriched retentate, a third membrane separation subunit which makes it possible to receive the first permeate and to produce a third methane-enriched retentate and a third $CO_2$-enriched permeate.
  the adsorption unit is a pressure swing adsorption (PSA) unit.
  steps i to vi are carried out continuously,
  in step ii, each adsorber of the adsorption unit will follow, with phase shift, the pressure cycle comprising the following successive periods:
  a. adsorption during which the feed gas is introduced via one of the ends of the adsorber and at least one portion of the VOCs is adsorbed by the adsorbent,
  b. depressurization during which a portion of the VOCs present in the adsorbent is discharged from the adsorber, which is no longer supplied with feed gas, via at least one of its ends,
  c. elution during which a purge gas circulates through the bed of adsorbent in order to help in the desorption of the VOCs,
  d. repressurization during which the adsorber is at least partially repressurized,
  in step c, the purge gas consists of at least one portion of the carbon dioxide-enriched permeate from the membrane separation unit,
  the purge gas leaving the adsorption unit is burnt in a thermal oxidizer at atmospheric pressure or is sent to the facility vent,
  the carbon dioxide-enriched permeate is sent directly to the vent or to a thermal oxidizer during periods in which said permeate does not pass through any adsorber,
  the pressure cycle comprises a dead time step,
  the depressurization begins with a co-current depressurization by pressure balancing with another adsorber,
  steps iv, v and vi are carried out automatically by data transmission and data processing means,
  the feed gas stream is biogas,
  the means for measuring a property is a pressure sensor adapted and configured to measure the pressure of the gas stream entering the membrane separation unit and/or a methane analyzer adapted and configured to measure the methane concentration in this same stream and/or a pressure sensor(s) adapted and configured to measure the pressure in each of the adsorbers.

DETAILED DESCRIPTION OF THE INVENTION

Figure 1:
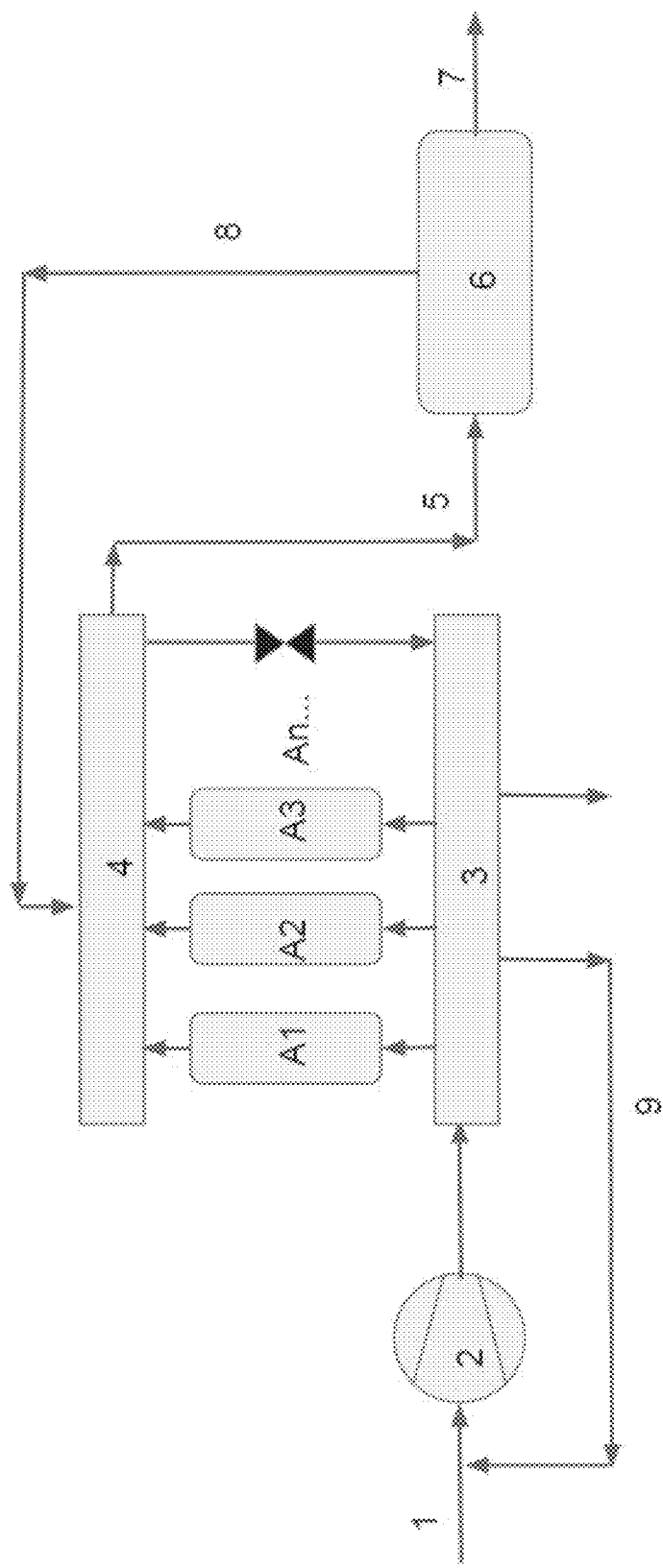
FIG. 1 is a schematic of an embodiment of the invention.

Generally speaking, a gas phase adsorption process makes it possible to separate one or more molecules from a gas mixture containing said molecules, by utilizing the difference in affinity of one or more adsorbents for the various constituent molecules of the mixture. The affinity of an adsorbent for a molecule depends partly on the structure and composition of the adsorbent and partly on the properties of the molecule, particularly its size, electronic structure and multipole moments. An adsorbent can be, for example, a zeolite, an activated carbon, an optionally doped activated alumina, a silica gel, a carbon molecular sieve, an organo-metallic structure, an alkaline or alkaline-earth metal oxide or hydroxide, or a porous structure preferably containing a substance capable of reversibly reacting with the molecules, such as amines, physical solvents, metal complexing agents, metal oxides or hydroxides, for example.

The most commonly used adsorbent materials are in the form of particles (beads, sticks, crushed materials, etc.), but they can also be found in structured form, such as monoliths, wheels, parallel passage contactors, fabrics, fibres, etc.

There are 3 main families of adsorption processes: lost-charge processes, TSA (temperature swing adsorption) processes and finally PSA (pressure swing adsorption) processes.

In lost-charge processes—the term "guard beds" is often used in this case—a new charge is introduced when the existing charge is saturated with impurities, or more generally when it is no longer able to provide adequate protection.

In TSA processes, the adsorbent, at the end of use, is regenerated in situ, that is to say that the impurities captured are discharged in order for said adsorbent to recover the greater part of its adsorption capabilities and to be able to recommence a purification cycle, the main regeneration effect being due to a rise in temperature.

Lastly, in PSA processes, the adsorbent, at the end of the production phase, is regenerated by desorption of the impurities, which is achieved by means of a fall in their partial pressure. This fall in pressure can be achieved by a fall in the total pressure and/or by flushing with a gas devoid of or containing little in the way of impurities.

This last process, PSA, is of interest here.

In the context of the present invention, the term PSA denotes any process for the purification or separation of gas employing a cyclical variation in the pressure which the adsorbent experiences between a high pressure, referred to as adsorption pressure, and a low pressure, referred to as regeneration pressure. Thus, this generic designation of PSA is employed without distinction to denote the following cyclical processes, to which it is also commonplace to give more specific names, depending on the pressure levels employed or the time necessary for an adsorber to return to its starting point (cycle time):

VSA processes, in which the adsorption is carried out substantially at atmospheric pressure, preferably between 0.95 and 1.25 bar abs, and the desorption pressure is lower than atmospheric pressure, typically from 50 to 400 mbar abs.

MPSA or VPSA processes, in which the adsorption is carried out at a high pressure greater than atmospheric pressure, typically between 1.4 and 6 bar abs, and the desorption is carried out at a low pressure lower than atmospheric pressure, generally of between 200 and 600 mbar abs.

PSA processes properly speaking, in which the high pressure is substantially greater than atmospheric pressure, typically between 3 and 50 bar abs, and the low pressure is substantially equal to or greater than atmospheric pressure, generally between 1 and 9 bar abs.

RPSA (Rapid PSA) processes, for which the duration of the pressure cycle is typically less than a minute.

URPSA (Ultra Rapid PSA) processes, for which the duration of the pressure cycle is of the order of a maximum of a few seconds.

It should be noted that these various designations are not standardized and that the limits are subject to variation. Once again, unless otherwise stated, the use of the term PSA here covers all of these variants.

An adsorber will thus begin a period of adsorption at the high pressure until it is loaded with the constituent or constituents to be captured and will then be regenerated by depressurization and extraction of the adsorbed compounds, before being restored in order to again begin a new adsorption period. The adsorber has then completed a "pressure cycle" and the very principle of the PSA process is to link together these cycles one after the other; it is thus a cyclical process. The time which an adsorber takes to return to its initial state is known as cycle time. In principle, each adsorber follows the same cycle with a time offset, which is known as phase time or more simply phase. The following relationship thus exists:

phase time=cycle time/number of adsorbers and it is seen that the number of phases is equal to the number of adsorbers.

This cycle thus generally comprises periods of:

Production or Adsorption, during which the feed gas is introduced via one of the ends of the adsorber, the most adsorbable compounds are adsorbed preferentially and the gas enriched with the least adsorbable compounds (product gas) is extracted via the second end. The adsorption can be carried out at an increasing pressure, at a substantially constant pressure or even at a slightly decreasing pressure. The term HP pressure (high pressure) is used to denote the adsorption pressure.

Depressurization, during which a portion of the compounds present in the adsorbent and in the free spaces is discharged from the adsorber, which is no longer supplied with feed gas, via at least one of its ends. Taking as reference the direction of circulation of the fluid in the adsorption period, it is possible to define co-current, counter-current or simultaneously co- and counter-current depressurizations.

Elution or Purge, during which a gas enriched with the least adsorbable constituents (purge gas) circulates through the adsorbent bed in order to help in the desorption of the most adsorbable compounds. Purging is generally performed counter-currently.

Repressurization, during which the adsorber is at least partially repressurized before again starting an Adsorption period. Repressurization can take place counter-currently and/or co-currently.

Dead time, during which the adsorber remains in the same state. These dead times can form an integral part of the cycle, making it possible to synchronize steps between adsorbers, or form part of a step which has finished before the allotted time. The valves can be closed or remain in the same state, depending on the characteristics of the cycle.

When the recovered product is made up of the most adsorbable constituents, a Rinse step can be added, which involves circulating a gas enriched with the most adsorbable constituents co-currently in the adsorber, with the aim of driving the least adsorbable compounds out of the adsorbent and the dead spaces. This Rinse step can be carried out at any pressure between the high pressure and the low pressure and generally uses a fraction of the low-pressure product following compression. The gas extracted from the adsorber during this step can be used for various purposes (secondary production of gas enriched with the least adsorbable constituents, repressurization, elution, fuel gas network, etc.).

In an embodiment of the invention and as illustrated in FIG. 1, the feed gas stream 1 comprising at least methane, carbon dioxide and volatile organic compounds (VOCs) is compressed in the compressor 2 to a pressure of between 8 and 15 barg. Then, by means of a first set of valves 3, the compressed gas stream is successively introduced, according to the pressure cycle mentioned above, into the adsorbers A1, A2 and A3. Since these three adsorbers comprise at least one adsorbent making it possible to remove at least one portion of the VOCs, the VOCs are at least partially removed from the gas stream. A methane- and carbon dioxide-enriched gas stream 5 is recovered at the outlet of the adsorbers by means of a second set of valves 4.

The methane and the carbon dioxide of the gas stream 5 are separated in the membrane separation unit 6. A methane-rich retentate 7 and a carbon dioxide-rich permeate 8 are thus recovered at the outlet of the membrane separation unit 6. The carbon dioxide-rich permeate 8 is recycled as purge gas to the adsorbers A1, A2 and A3 by means of the second set of valves 4. During the periods in which said permeate 8 does not pass through any adsorber, said permeate 8 bypasses the adsorbers via a bypass valve. The permeate 8 is then sent directly to the vent or to a thermal oxidizer. During the periods in which the permeate 8 is recycled as purge gas to the adsorbers, the permeate leaving the adsorption unit is burnt in a thermal oxidizer at atmospheric pressure or is sent to the facility vent. Another possibility is that, when the purge gases are not used to regenerate the adsorbents, they are recycled upstream of the compressor 9.

According to one particular case, the feed gas stream comprises:
water,
organic compounds such as mercaptans, sulfites and thiophenes,
COS and/or $H_2S$, and
BTEX (Benzene, Toluene, Ethylbenzene and Xylene) components and/or heavy $C_nH_m$ hydrocarbons.

Figure 2:
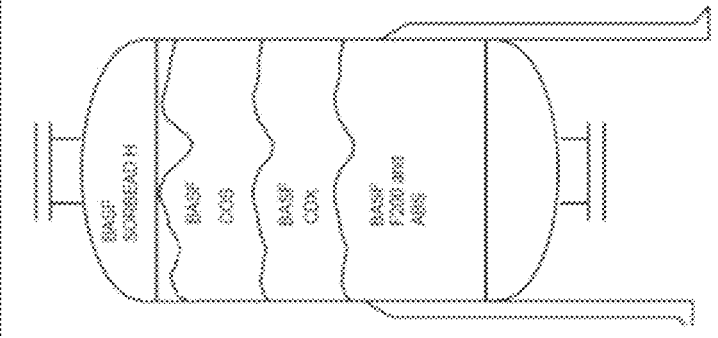
FIG. 2 is a schematic and table illustrating components of an embodiment of the adsorber used in the invention.

In this particular case, the adsorbers A1, A2 and A3 comprise five layers of adsorbents: First layer of adsorbent used as a support for the subsequent adsorbents, second layer of activated alumina for drying the gas stream, third layer of activated alumina for fixing the organic compounds such as mercaptans, sulfites, thiophenes, fourth layer of adsorbents for removing the COS and $H_2S$, fifth layer used to fix the BTEX components and heavy $C_nH_m$ hydrocarbons. [FIG. 2] gives an example of an adsorber comprising these five layers of adsorbents.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A facility for the treatment of a feed gas stream comprising at least methane, carbon dioxide and volatile organic compounds (VOCs) and for producing a methane-enriched gas stream following the treatment, said facility comprising, in a direction of circulation of the feed gas stream:
   at least one compressor adapted and configured to increase a pressure of the feed gas stream to a pressure of between 8 and 15 barg;
   at least one adsorption unit comprising at least three adsorbers each of which follows a phase shifted pressure cycle and contains an adsorbent adapted and configured to remove at least a portion of the VOCs from the feed gas stream to yield a VOC-depleted feed gas stream;
   at least one membrane separation unit in fluid communication with said at least one adsorption unit so as to separate the VOC-depleted feed gas stream into a carbon dioxide-enriched permeate and a methane-enriched retentate;
   a pressure sensor adapted and configured to measure a pressure of the VOC-depleted feed gas stream and/or a pressure sensor(s) adapted and configured to measure a pressure in each of the adsorbers; and
   a controller adapted and configured to compare, with a target value, the measured VOC-depleted feed stream pressure and/or the measured pressure in each of the adsorbers and adjust a flow of the feed gas stream in order to reach the target value.

2. The facility of claim 1, further comprising at least one set of valves at an inlet of the adsorbers and a set of valves at an outlet of the adsorbers, wherein the controller adjusts the flow of the feed gas stream utilizing said at least one set of valves at the inlet of the adsorbers and said set of valves at the outlet of the adsorbers.

3. The facility of claim 1, further comprising a recycle line in flow communication between the at least one membrane separation unit and the at least one adsorption unit that is adapted and configured to recycle at least a portion of the carbon dioxide-enriched permeate to at least one of the adsorbers.

4. The facility of claim 3, further comprises a bypass line adapted and configured to bypassing the recycle line.

5. The facility of claim 1, wherein each membrane separation unit of said at least one membrane separation unit comprises:
   a first membrane separation subunit adapted and configured to separate the VOC-depleted feed gas stream from the adsorbers into a first carbon dioxide-enriched permeate and a first methane-enriched retentate;
   a second membrane separation subunit adapted and configured to separate the first retentate into a second carbon dioxide-enriched permeate and a second methane-enriched retentate; and
   a third membrane separation subunit adapted and configured to separate the first permeate into a third methane-enriched retentate and a third $CO_2$-enriched permeate.

6. A process for treating a feed gas stream comprising at least methane, carbon dioxide and volatile organic compounds (VOCs), for producing a methane-enriched gas stream, comprising the steps of:
   providing the facility of claim 1;
   compressing the feed gas stream to a pressure of between 8 and 15 barg with the compressor;
   removing at least a portion of the VOCs in the feed gas stream, by adsorption, in the at least one adsorption unit to yield a VOC-depleted feed gas stream;
   separating the a VOC-depleted feed gas stream with the at least one membrane separation unit into a methane-enriched stream and one or more carbon dioxide-enriched streams and;
   measuring one or more of a pressure of the VOC-depleted feed gas stream entering the at least one membrane separation unit and a pressure in each of the adsorbers;
   comparing, with a target value, a value of the measurement made in said step of measuring; and
   on the basis of said step of comparing, if there is a difference between the measurement value and the target value, adjusting a flow of the feed gas stream in order to obtain the target value.

7. The process of claim 6, wherein each of said steps are carried out continuously.

8. The process of claim 6, wherein each adsorber contains at least one bed of adsorbent and each adsorber follows, with a phase shift, a pressure cycle comprising successive periods of:
   a. at least a portion of the VOCs in the feed gas stream is adsorbed by the at least one adsorbent bed after introduction of the feed gas stream into the adsorber via an end thereof;
   b. depressurizing the adsorber during which a portion of the VOCs adsorbed onto the at least one adsorbent bed is discharged from the adsorber, the depressurization occurring at a time when the feed gas stream is not being introduced into the adsorber;
   c. circulating a purge gas through the at least one adsorbent bed of adsorbent in an elution step in order to help in desorption of the VOCs therefrom; and
   d. at least partially repressurizing the adsorber.

9. The process of claim 8, wherein the purge gas consists of at least a portion of the one or more carbon dioxide-enriched streams.

10. The process of claim 9, wherein the purge gas leaving the at least one adsorption unit is either burnt in a thermal oxidizer at atmospheric pressure or vented to atmosphere.

11. The process of claim 9, wherein during periods of time in which said at least a portion of the one or more carbon dioxide-enriched streams is circulated as a purge gas in one of the adsorbers, said at least a portion of the one or more carbon dioxide-enriched streams is sent directly to a thermal oxidizer or is vented to atmosphere.

12. The process of claim 8, wherein the pressure cycle further comprises a dead time step.

13. The process of claim 8, wherein the depressurization begins with a co-current depressurization by pressure balancing with another adsorber.

14. The process of claim 6, wherein the feed gas stream is biogas.

* * * * *